Aug. 31, 1926.

A. CROOK

VALVE

Filed April 26, 1926

1,598,265

Inventor
ALFRED CROOK,
By Jas. F. Richmond
Attorney

Patented Aug. 31, 1926.

1,598,265

UNITED STATES PATENT OFFICE.

ALFRED CROOK, OF PHILADELPHIA, PENNSYLVANIA, ASSIGNOR TO TIOGA STEEL AND IRON COMPANY, OF PHILADELPHIA, PENNSYLVANIA, A CORPORATION OF PENNSYLVANIA.

VALVE.

Application filed April 26, 1926. Serial No. 104,724.

My invention relates more particularly to heavy duty gate valves of the type characterized by an extruded and forged valve body and separately forged hubs mechanically attached thereto. Mechanical connections, such as heretofore proposed for this purpose, contemplate joints penetrating the side walls of the valve body and communicating with the pressure chamber and, hence, a prolific source of leakage under the deflection and distortion resulting from high pressure and high temperature conditions.

The principal object of my invention is to insure fluid tightness of a forged valve body with respect to its line connections; and the nature of the invention consists in eliminating all joints which depend upon penetration of the walls of the valve body, and substituting therefor external connections which not only perform the primary office of serving as line connections but also serve as reinforcements to enable the walls of the body efficiently to resist distortion, and in any event and with or without distortion are effective to prevent escape of fluid from the pressure chamber to the atmosphere.

With such and other objects in view my invention resides in certain improvements in valve bodies, hubs, and methods of assembly, all as hereinafter described and particularly pointed out in the claims.

In the accompanying drawings:—

Figure 1:
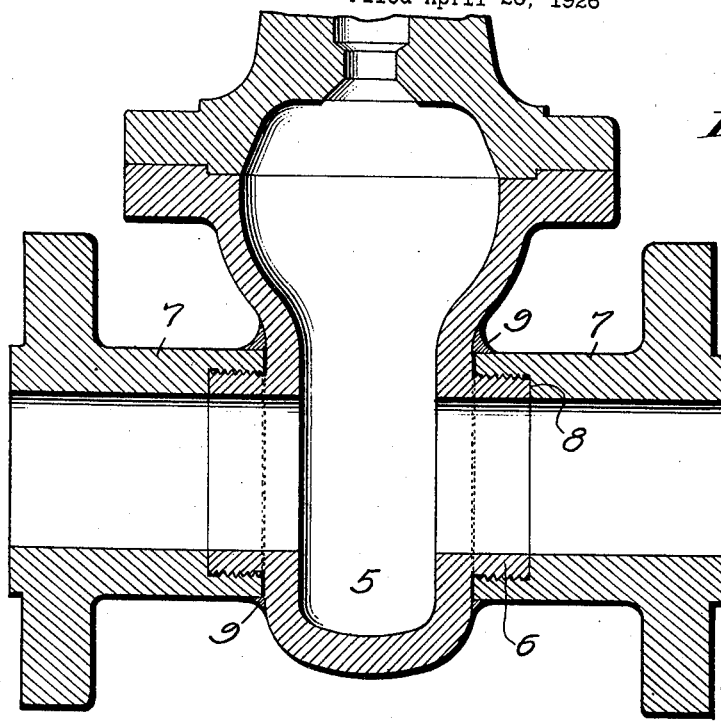
Figure 2:
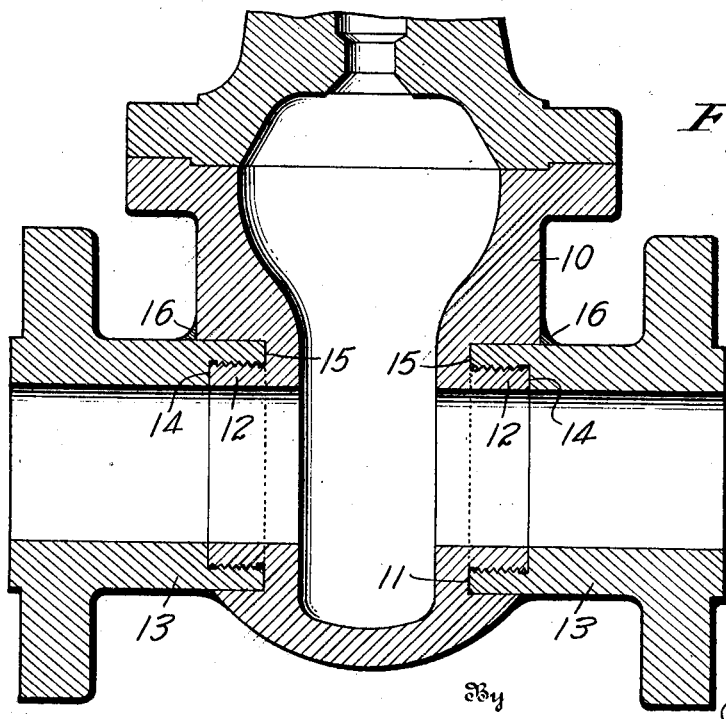

Figure 1 is a sectional view of a valve body and hub assembly embodying my invention; and Fig. 2 is a similar view of a modification.

According to my invention, the extruded body 5, with solid side walls, is formed with opposed laterally directed offsets 6, which ultimately are pierced to establish a fluidway. The offsets 6 when machined or finished constitute nipples which serve to reinforce the sidewalls of the body 5 and which are externally threaded for union with flanged hubs 7. The ends of the hubs are reduced initially, or by turning, and the annular seat or shoulder 8, thus provided, is at such depth as to permit the hub end to be ground seated with relation to the extremity of the nipple. Thus assembled, a fillet weld 9 is applied where the hub abuts the body in order to prevent relative movement of the parts and to insure fluid tightness.

In the embodiment, Fig. 2 distortion of the body is substantially eliminated by increasing the section of the side walls 10. The heavy section of the side walls admits of machining in the nature of annular recesses 11 thereby to provide nipples 12 for the threaded reception of hubs 13. With the hubs screwed home and substantially ground seated at their plural points of end contact 14 and 15, and the nipple rolled, if need be, to insure thread tightness, the connection is completed by a fillet weld 16.

Having described my invention, I claim:—

1. A valve body having nipples or hub extensions, hubs ground seated with respect to both body and nipples, and means permanently securing the parts in ground seated relation.

2. A valve body having nipples or hub extensions, hubs ground seated with respect to both body and nipples and having thread connection with said nipples and means permanently securing the parts in the relation stated.

3. A valve body having nipples or hub extensions, hubs ground seated with respect to both body and nipples and having thread connection with said nipples and a weld connection permanently securing the parts in the relation stated.

4. A valve body consisting of a cup shape forging having side walls of relatively heavy section and machined formed fluidway bosses in said walls, and line connections secured externally of the bosses.

5. A valve body consisting of a cup shape forging having side walls of relatively heavy section and machined formed fluidway bosses in said walls, and line connections secured externally of the bosses and metallically secured to the side walls.

6. A forged valve body having integral fluidway extensions, bounded by sockets, and line extensions penetrating the sockets secured to the body in fluid tight relation.

7. A forged valve body having integral fluidway bosses bounded by sockets, and line extensions penetrating the sockets and permanently joined to the bosses and body.

8. The method herein described, which consists in providing a forged valve body having side walls of relatively heavy section, piercing and machining the side walls to provide fluidway connections, and permanently securing hubs to said connections.

9. The method herein described, which consists in providing a forged valve body having side walls of relatively heavy section, piercing and machining the side walls to provide fluidway connections, and permanently securing hubs to said connections and to the body.

10. The method herein described, which consists in providing a forged valve body having side walls of relatively heavy section in the region of the trim, piercing and machining the side walls to provide fluidway connections extending beyond the body, thread securing and ground seating hubs with relation to the connections and body, and metallically securing the hubs to said body In testimony whereof I affix my signature.

ALFRED CROOK.